(12) United States Patent
Sato

(10) Patent No.: US 10,178,134 B2
(45) Date of Patent: Jan. 8, 2019

(54) MANAGEMENT APPARATUS AND METHOD FOR CONTROLLING MANAGEMENT APPARATUS

(71) Applicant: CANON KABUSHIKI KAISHA, Tokyo (JP)

(72) Inventor: Junji Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/671,981

(22) Filed: Aug. 8, 2017

(65) Prior Publication Data

US 2017/0339195 A1 Nov. 23, 2017

Related U.S. Application Data

(63) Continuation of application No. 14/793,555, filed on Jul. 7, 2015, now Pat. No. 9,762,615.

(30) Foreign Application Priority Data

Jul. 10, 2014 (JP) .................................. 2014-142725

(51) Int. Cl.
*G06F 17/00* (2006.01)
*H04L 29/06* (2006.01)

(52) U.S. Cl.
CPC ............ *H04L 63/20* (2013.01); *H04L 63/083* (2013.01)

(58) Field of Classification Search
CPC .............................. H04L 63/20; H04L 63/083
USPC ............................................................. 726/1
See application file for complete search history.

(56) References Cited

U.S. PATENT DOCUMENTS

| 2004/0109196 A1* | 6/2004 | Nakao ................. H04N 1/00278 358/1.15 |
| 2007/0103536 A1* | 5/2007 | Fujimaki .................... B41J 3/44 347/106 |
| 2010/0104099 A1* | 4/2010 | Kim ....................... H04W 12/08 380/270 |

FOREIGN PATENT DOCUMENTS

| JP | 2004094401 A | 3/2004 |
| JP | 2006101393 A | 4/2006 |
| JP | 2006243791 A | 9/2006 |

* cited by examiner

*Primary Examiner* — Mohammad W Reza
(74) *Attorney, Agent, or Firm* — Canon U.S.A., Inc. IP Division

(57) ABSTRACT

A device management apparatus sets a first password required to reflect a security policy managed by the device management apparatus on a device or change the security policy in a device, generates distribution data including the security policy and the set first password, and distributes the generated distribution data to a selected device.

6 Claims, 26 Drawing Sheets

FIG. 5A

SECURITY POLICY CONFIRMATION

CURRENT SECURITY POLICY:

POLICY VERSION: 1.00
- PROHIBIT TRANSMISSION OF FAX
- PROHIBIT RECEPTION OF FAX
- PROHIBIT USE OF USB INTERFACE

PLEASE ENTER PASSWORD TO CHANGE SECURITY POLICY:

********

CHANGE     CANCEL

FIG. 5B

SECURITY POLICY SETTINGS

POLICY VERSION: 1.00

NETWORK POLICY
- [✓] PROHIBIT TRANSMISSION OF FAX
- [✓] PROHIBIT RECEPTION OF FAX
- [ ] PROHIBIT USE OF ELECTRONIC MAIL

INTERFACE POLICY
- [ ] PROHIBIT USE OF OPERATION PANEL
- [✓] PROHIBIT USE OF USB INTERFACE

[OK] [CANCEL]

FIG. 7

```
SECURITY POLICY SETTINGS

POLICY NAME:    [PUBLIC SPACE        ]
         POLICY VERSION: [1.00              ▼]

┌─ NETWORK POLICY ─────────────────────────┐
    │  [✓] PROHIBIT TRANSMISSION OF FAX        │
    │  [✓] PROHIBIT RECEPTION OF FAX           │
    │  [ ] PROHIBIT USE OF ELECTRONIC MAIL     │
    └──────────────────────────────────────────┘

┌─ INTERFACE POLICY ───────────────────────┐
    │  [ ] PROHIBIT USE OF OPERATION PANEL     │
    │  [✓] PROHIBIT USE OF USB INTERFACE       │
    └──────────────────────────────────────────┘

[  OK  ]  [ CANCEL ]
```

FIG. 9

SECURITY POLICY SELECTION

| POLICY NAME | POLICY VERSION | UPDATE DATE AND TIME | ⋯ |
|---|---|---|---|
| ◉ PUBLIC SPACE | V1.00 | 2014/4/1 7:00:45 | ⋯ |
| ○ HEAD OFFICE DEPARTMENT | V1.10 | 2014/4/2 10:11:09 | ⋯ |
| ⋯ | ⋯ | ⋯ | ⋯ |

OK    CANCEL

FIG. 10

DEVICE SELECTION

SECURITY POLICY TO BE DISTRIBUTED: PUBLIC SPACE
(POLICY VERSION: V1.00)

| DEVICE NAME | SUPPORTED POLICY VERSION | MODEL NAME | INSTALLATION LOCATION | ... |
|---|---|---|---|---|
| ☑ DEVICE A | V1.00 | MODEL X | IN FRONT OF RECEPTION COUNTER ON 1ST FLOOR | ... |
| ☑ DEVICE B | V1.10 | MODEL Y | LOBBY ON 1ST FLOOR | ... |
| ☐ DEVICE C | V1.00 | MODEL X | CONFERENCE ROOM A | ... |
| ... | | | ... | ... |

[ OK ]  [ CANCEL ]

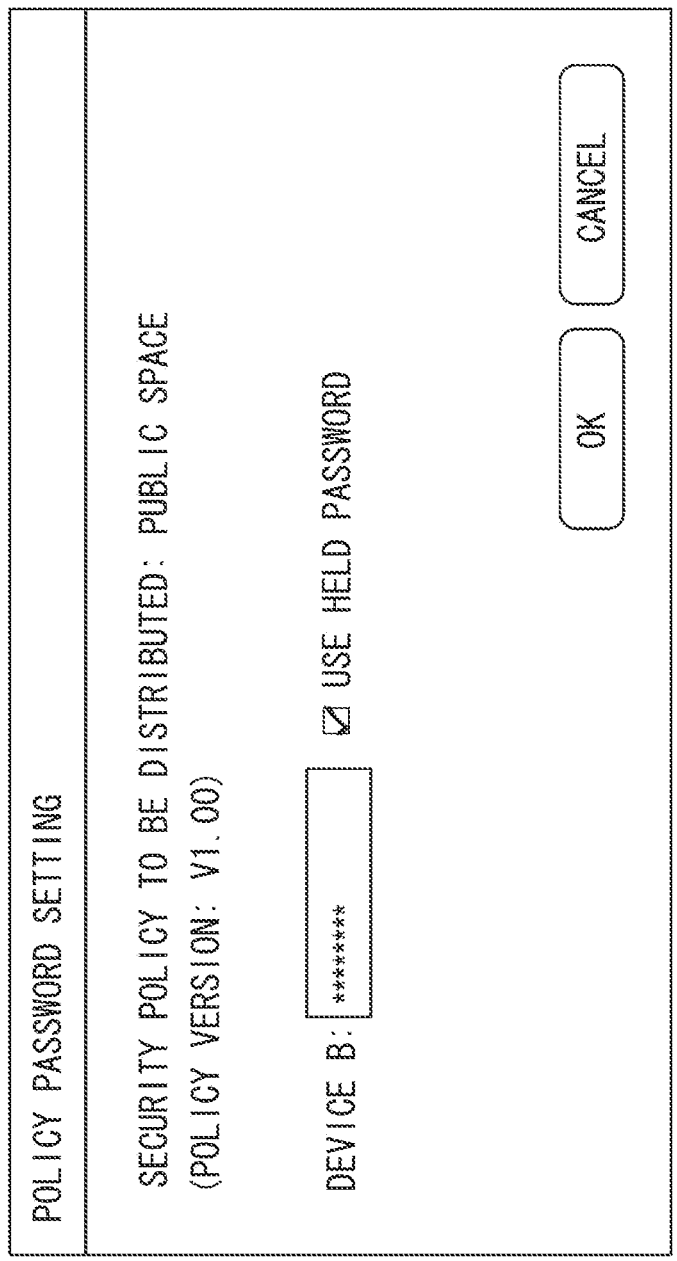

FIG. 12A

```xml
<?xml version="1.0" encoding="UTF-8"?>
<Settings>
    <SecurityPolicySettings ID="P0001" Version="1.00" Name="PUBLIC SPACE">    1201
        <PolicyPassword>Ax4dik9e</PolicyPassword>                              1202
        <PolicyItems>                                                          1203
            <Item ID="I0001">true</Item>
            <Item ID="I0002">true</Item>
            <Item ID="I0003">false</Item>
            <Item ID="I0004">false</Item>
            <Item ID="I0005">true</Item>
            ....
        </PolicyItems>
    </SecurityPolicySettings>
</Settings>
```

FIG. 12B

```
<?xml version="1.0" encoding="UTF-8"?>
<Settings>
  <SecurityPolicySettings ID="P0001" Version="1.00" Name="PUBLIC SPACE">
    <PolicyPassword>Buw5j2qg</PolicyPassword>
    <PolicyItems>
      <Item ID="I0001">true</Item>
      <Item ID="I0002">true</Item>
      <Item ID="I0003">false</Item>
      <Item ID="I0004">false</Item>
      <Item ID="I0005">true</Item>
      ****
    </PolicyItems>
  </SecurityPolicySettings>
</Settings>
```

1201 — SecurityPolicySettings line
1204 — PolicyPassword
1203 — PolicyItems

FIG. 13

| POLICY ITEM ID | DISPLAY NAME | VALUE |
|---|---|---|
| 10001 | PROHIBIT TRANSMISSION OF FAX | TRUE |
| 10002 | PROHIBIT RECEPTION OF FAX | TRUE |
| 10003 | PROHIBIT USE OF ELECTRONIC MAIL | FALSE |
| 10004 | PROHIBIT USE OF OPERATION PANEL | FALSE |
| 10005 | PROHIBIT USE OF USB INTERFACE | TRUE |
| ... | ... | ... |

FIG. 18

| DEVICE ID | DEVICE NAME | SERIAL NO. | SUPPORTED POLICY VERSION | POLICY PASSWORD | ... |
|---|---|---|---|---|---|
| D0001 | DEVICE A | 0000000A | V1.00 | | ... |
| D0002 | DEVICE B | 0000000B | V1.10 | Buw5j2qg | ... |
| D0003 | DEVICE C | 0000000C | V1.00 | | ... |
| ... | ... | | | ... | |

FIG. 20

```
<?xml version="1.0" encoding="UTF-8"?>
<Settings>
    <SecurityPolicySettings Version="1.20">                         ~2001
        <PolicyPassword>DpQ2kx7U</PolicyPassword>                   ~2002
        <PolicyItems>
            <Item ID="10001"> false</Item>
            <Item ID="10002"> false</Item>                          ~2003
            <Item ID="10003"> false</Item>
            <Item ID="10004"> false</Item>
            <Item ID="10005"> true</Item>
            ...
        </PolicyItems>
    </SecurityPolicySettings>
    <DeviceInformation>                                             ~2004
        <Name>DEVICE D</Name>
        <SerialNo>000000D</SerialNo>
        <ModelName> MODEL Z</ModelName>
        ...
    </DeviceInformation>
</Settings>
```

FIG. 21

| POLICY ID | POLICY NAME | POLICY VERSION | ACQUISITION SOURCE DEVICE ID | POLICY PASSWORD AT TIME OF ACQUISITION |
|---|---|---|---|---|
| P0001 | PUBLIC SPACE | V1.00 | | |
| P0002 | HEAD OFFICE DEPARTMENT | V1.10 | | |
| P0003 | REUSE SECURITY POLICY | V1.20 | D0004 | DpQ2kx7U |
| ... | ... | ... | ... | ... |

FIG. 23

POLICY PASSWORD SETTING

SECURITY POLICY TO BE DISTRIBUTED: REUSE SECURITY POLICY
(POLICY VERSION: V1.20)

DEVICE A: [ ]

DEVICE B: [Buw5j2qg]

DEVICE D: [Dp02kx7U]

☑ USE HELD PASSWORD

☑ USE PASSWORD AT TIME OF
   ACQUISITION OF POLICY

[ OK ]   [ CANCEL ]

MANAGEMENT APPARATUS AND METHOD FOR CONTROLLING MANAGEMENT APPARATUS

CROSS-REFERENCE TO RELATED APPLICATIONS

This application is a continuation of U.S. patent application Ser. No. 14/793,555 filed Jul. 7, 2015, which claims the benefit of Japanese Patent Application No. 2014-142725, filed Jul. 10, 2014, the disclosures of each of which are hereby incorporated by reference herein in their entirety.

BACKGROUND OF THE INVENTION

Field of the Invention

The present invention relates to a technique for distributing setting information for security (a security policy) to a device via a network.

Description of the Related Art

Conventionally, there is a technique for distributing setting information to a device existing on a network, such as an image forming apparatus. The setting information includes information about a user who uses the device, address book information, and setting values of an application that operates on the device.

For example, Japanese Patent Application Laid-Open No. 2013-243488 discusses a technique in which, when a device is replaced with another device, a management apparatus distributes part of setting information acquired from the device before replacement to the device after replacement.

In recent years, there has also been a need to make settings for various types of devices according to security guidelines based on a network environment and the operation of an office. Generally, the settings regarding security guidelines are termed a security policy.

A security policy is settings used to ensure security. If devices in the same organization use different security policies, a security hole may occur. Thus, it is considered desirable to collectively distribute a security policy to all devices on a network to reflect the settings for the security policy in all the devices.

The security policy, however, is not mere settings assumed in Japanese Patent Application Laid-Open No. 2013-243488, but serves as organizational security guidelines. Thus, if the security policy can be changed in each device after the distribution, this becomes a major problem. Thus, there is a need for a mechanism capable of distributing a security policy on a network by employing a management system different from that of normal setting information and also taking convenience into account.

SUMMARY OF THE INVENTION

The present invention is directed to a mechanism capable of safely managing a security policy to prevent an inadvertent change to the security policy, and collectively distributing the security policy to a plurality of devices on a network to reflect the security policy therein.

According to an aspect of the present invention, a management apparatus for managing a device capable of communicating on a network includes a first management unit configured to manage a security policy indicating a setting value of a setting item for security for a device, a selection unit configured to select a device to which the managed security policy is to be distributed, a setting unit configured to set a first password required to reflect the security policy on the selected device or change the security policy in the selected device, a generation unit configured to generate distribution data including the security policy and the set first password, and a distribution unit configured to distribute the generated distribution data to the selected device.

Further features of the present invention will become apparent from the following description of exemplary embodiments with reference to the attached drawings.

BRIEF DESCRIPTION OF THE DRAWINGS

FIGS. 5A and 5B each illustrate an example of an operation screen for a security policy, which is provided by a device.

FIG. 7 illustrates an example of a screen for setting a security policy, which is provided by the management apparatus.

FIG. 9 illustrates an example of a screen for selecting a security policy.

FIG. 10 illustrates an example of a screen for selecting a device as a distribution target.

FIGS. 11A and 11B each illustrate an example of a screen for receiving an entry of a policy password.

FIGS. 12A and 12B each illustrate an example of setting information to be distributed to a device by the management apparatus.

FIG. 13 illustrates an example of setting contents of a security policy.

FIG. 18 illustrates an example of contents of a device information database managed by the management apparatus.

FIG. 20 illustrates an example of setting information to be acquired by the management apparatus according to the second exemplary embodiment.

FIG. 21 illustrates security policies managed by a setting information database according to the second exemplary embodiment.

FIG. 23 illustrates an example of a screen for receiving an entry of a policy password according to the second exemplary embodiment.

DESCRIPTION OF THE EMBODIMENTS

Various exemplary embodiments of the present invention will be described in detail below with reference to the drawings.

Figure 1:
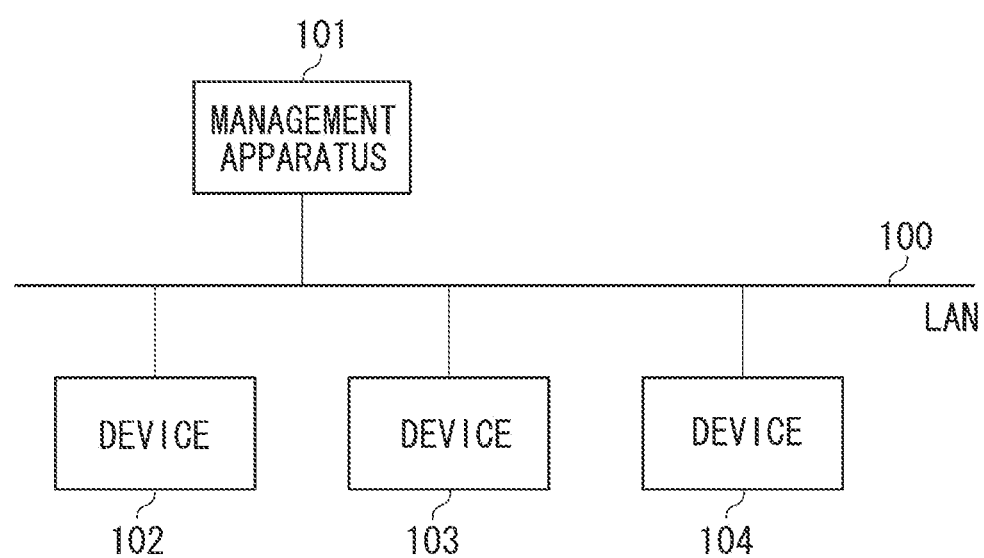
FIG. 1 is a diagram illustrating a configuration example of a network system according to a first exemplary embodiment of the present invention.

FIG. 1 illustrates a network system according to a first exemplary embodiment of the present invention. In this system, a management apparatus 101, which manages devices on a network, operates.

Devices 102, 103, and 104 are present on the network such as a local area network (LAN) 100, and are targets to be managed by the management apparatus 101. Examples of the devices 102, 103, and 104 include image forming apparatuses such as printers, copying machines, scanners, and cameras, smartphones, and tablets.

Figure 2:
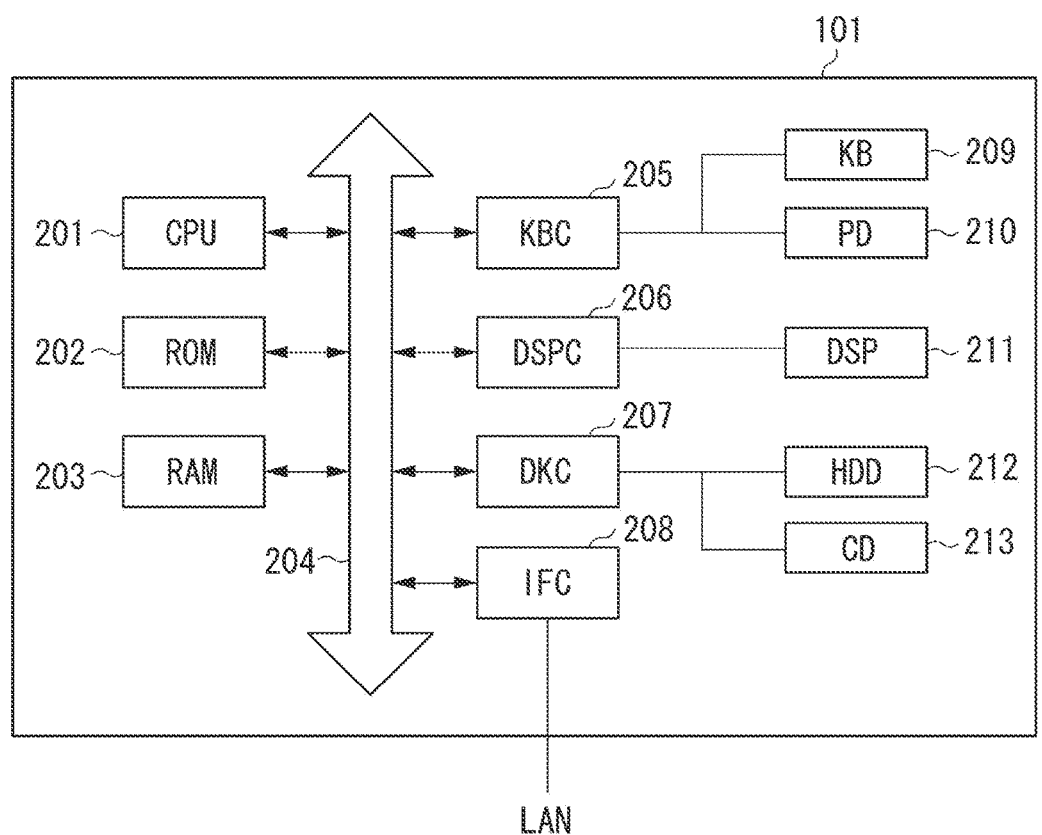
FIG. 2 is a diagram illustrating an example of a hardware configuration of a management apparatus.

FIG. 2 is a diagram illustrating an example of a hardware configuration of the management apparatus 101. In the present exemplary embodiment, the management apparatus 101 can be achieved using a general personal computer (PC).

A hard disk drive (HDD) 212 stores a program of device management software according to the present exemplary embodiment. The device management software is the main operating unit in all the following descriptions. A central processing unit (CPU) 201 is the main unit for execution on hardware in all the following descriptions unless otherwise specified. On the other hand, as described above, the device management software (program) stored in the hard disk drive (HDD) 212 is the main unit for control on software. That is, the CPU 201 reads and executes the device management program recorded in a computer-readable manner in the HDD 212, to implement the functions of the management apparatus 101 to be described below. A read-only memory (ROM) 202 stores Basic Input/Output System (BIOS) and a boot program. A random-access memory (RAM) 203 functions as a main memory or a work area for the CPU 201. A keyboard controller (KBC) 205 controls an instruction input from a keyboard (KB) 209 or a pointing device (PD) 210. A display controller (DSPC) 206 controls the display of a display (DSP) 211. A disk controller (DKC) 207 controls access to a storage device such as the hard disk drive (HDD) 212 or a Compact Disc Read-Only Memory (CD-ROM) (CD) 213. The hard disk drive (HDD) 212 or the CD-ROM (CD) 213 stores a boot program, an operating system (OS), a database, the device management program, and data of these. An interface controller (IFC) 208 transmits and receives information to and from another network device via the LAN 100. It does not matter whether the connection to the network is wired or wireless. These components are placed on a system bus 204.

Further, in the present exemplary embodiment, the OS is assumed to be, for example, Windows (registered trademark) manufactured by Microsoft Corporation, but is not limited to this.

Figure 3:
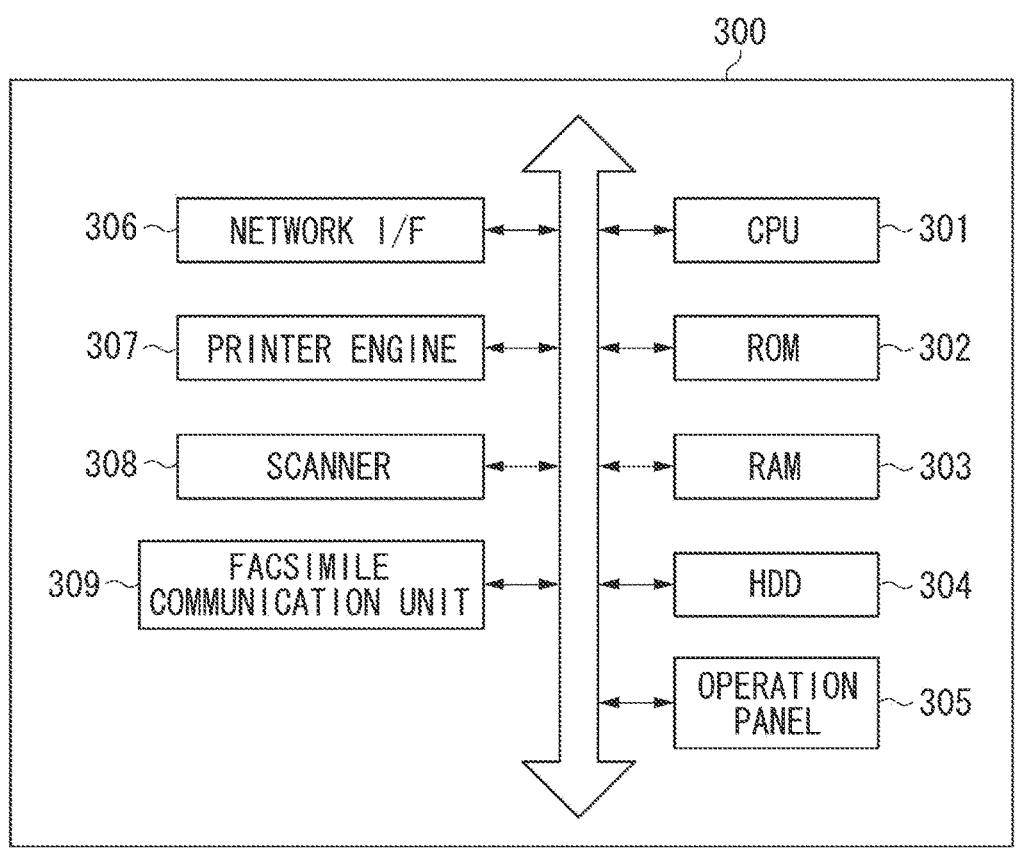
FIG. 3 is a diagram illustrating an example of a hardware configuration of a device.

FIG. 3 is a diagram illustrating an internal configuration of each of the devices 102, 103, and 104. FIG. 3 illustrates an image forming apparatus 300 having a print function, a scan function, and a network communication function as an example of the devices 102, 103, and 104.

A CPU 301 controls the entire image forming apparatus 300. A ROM 302 stores a print processing program to be executed by the CPU 301 and font data. A RAM 303 is used as a work area or a reception buffer for the CPU 301, or used by the CPU 301 to render an image. An HDD 304 records setting values of the image forming apparatus 300. An operation panel 305 includes various switches and buttons, a touch panel, and a liquid crystal display unit for displaying a message. On the operation panel 305, a user can operate the above setting values of the image forming apparatus 300. A network interface 306 is used to connect to the network. A printer engine 307 performs printing on a recording sheet. A scanner 308 is used to read a document. A facsimile communication unit 309 is used to transmit and receive a facsimile.

Figure 4:
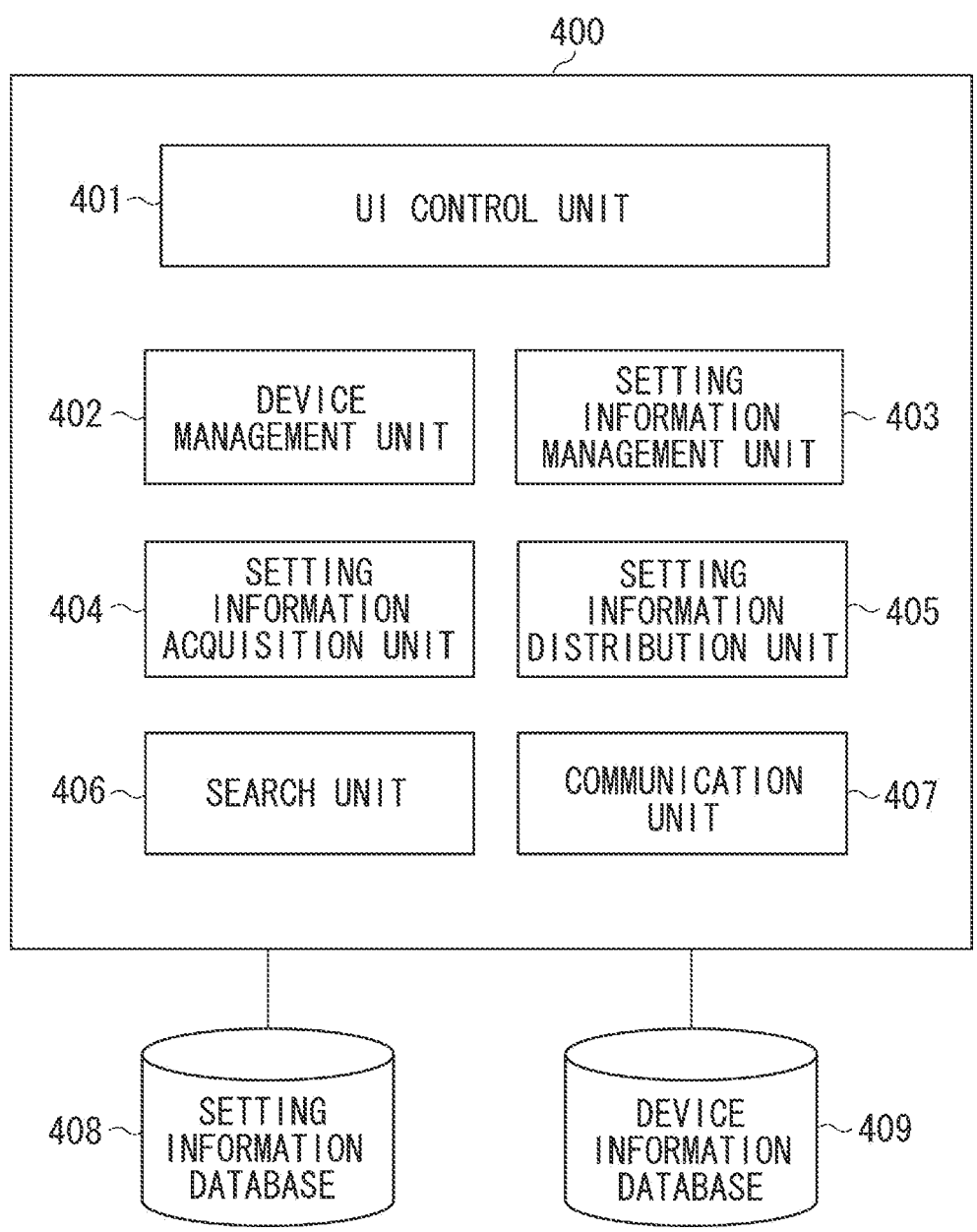
FIG. 4 is a diagram illustrating an example of a module configuration of software of the management apparatus.

FIG. 4 is a diagram illustrating an example of a module configuration achieved by executing device management software 400, which operates on the management apparatus 101. As described above, the device management software 400 is read from the HDD 212 and executed by the CPU 201.

A user interface (UI) control unit 401 provides a graphical user interface (GUI) for receiving an operation performed by an administrator of the devices 102, 103, and 104. The GUI is configured to be displayed on the display 211, which is provided in the management apparatus 101. Alternatively, the GUI can also be configured as a web application that can be used on another client PC, using the Hypertext Transfer Protocol (HTTP). In this case, the administrator performs an operation through the GUI displayed in a web browser of the client PC.

A device management unit 402 searches for a device connected to the LAN 100, via a search unit 406. The search for a device by the search unit 406 can be achieved by transmitting a search request packet such as a Service Location Protocol (SLP) packet or a Simple Network Management Protocol (SNMP) packet. The device management unit 402 can also acquire, via a communication unit 407, device information indicating the details (the device name, the model name, the serial number, the ability, and the state) of a device found in the search by the search unit 406. Further, the device management unit 402 stores and manages, in a device information database 409, address information (the Internet Protocol (IP) address, the media access control (MAC) address, and Global Positioning System (GPS) information) of the device and the device information acquired from the device. The information registered in the device information database 409 can also be viewed in the form of a device list by the user through the UI control unit 401.

A setting information management unit 403 instructs a setting information acquisition unit 404 to acquire setting information from the device via the communication unit 407 and stores the setting information in a setting information database 408. The setting information stored in the setting information database 408 can also be viewed by the user through the UI control unit 401. Further, the setting information management unit 403 can perform control so that the setting information stored in the setting information database 408 is distributed to the device via the setting information distribution unit 405. Setting information acquired from another management apparatus other than the device and setting information imported as a file by the administrator manually operating the device management unit 402 can also be stored and managed in the setting information database 408. The setting information distribution unit 405 distributes the setting information to the device via the communication unit 407.

At this time, in the present exemplary embodiment, the setting information acquisition unit 404 and the setting information distribution unit 405 achieve the acquisition and distribution of the setting information of the device by a web service using the HTTP and the Simple Object Access Protocol (SOAP) via the communication unit 407. The acquisition and distribution of the setting information of the device may be achieved using another communication protocol.

Further, the configuration can be such that when acquiring the setting information, the setting information acquisition unit 404 acquires only the setting value of a setting item determined in advance. Further, the configuration can be such that the setting information acquisition unit 404 acquires the setting value of a setting item selected by the user through the UI control unit 401. Similarly, the configuration can be such that when distributing the setting information, the setting information distribution unit 405 distributes the setting value of a predetermined setting item or a setting item selected by the user.

FIGS. 5A and 5B illustrate examples of operation screens for a security policy, which are provided by each of the devices 102, 103, and 104. A security policy setting screen of the device can be displayed on the operation panel 305 of the device or displayed by accessing a web server (not illustrated) of the device, using a web browser of a PC such as the management apparatus 101.

FIG. 5A illustrates a screen for confirming a security policy. In FIG. 5A, the current security policy is displayed on the screen. The policy version illustrated in FIG. 5A is version information corresponding to the contents of the security policy. Security policies in different policy versions have different settable items. Further, in FIG. 5A, the screen prompts the user to enter a password for changing the security policy. In the present exemplary embodiment, this password is referred to as a "policy password". Unlike a login password used for login processing for performing a normal operation on the device, the policy password is a dedicated password used only to change the security policy. That is, even if the user can log into the device and operate the device, the user cannot change the security policy unless the user knows the policy password.

FIG. 5B illustrates an example of a screen for setting the security policy, which is displayed when a correct policy password has been entered on the screen illustrated in FIG. 5A. On the screen illustrated in FIG. 5B, it is possible to change the setting values of various items for the security policy defined as a policy version 1.00. The user provides an input for enabling or disabling the items illustrated in FIG. 5B and then presses an "OK" button, so that a change to the setting values is reflected.

Figure 6A:
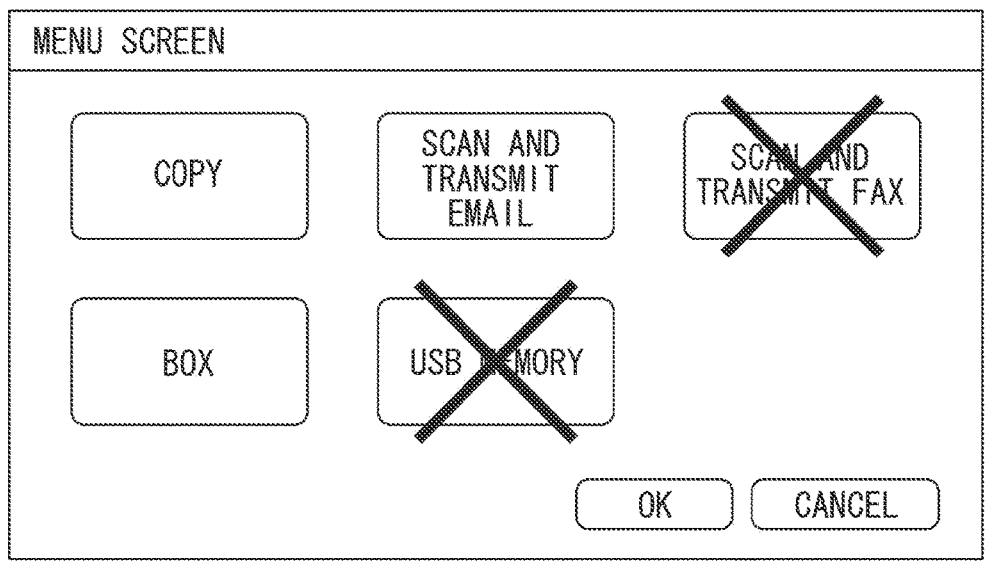
FIGS. 6A and 6B each illustrate an example of an operation screen of a device in which a security policy is reflected.
Figure 6B:
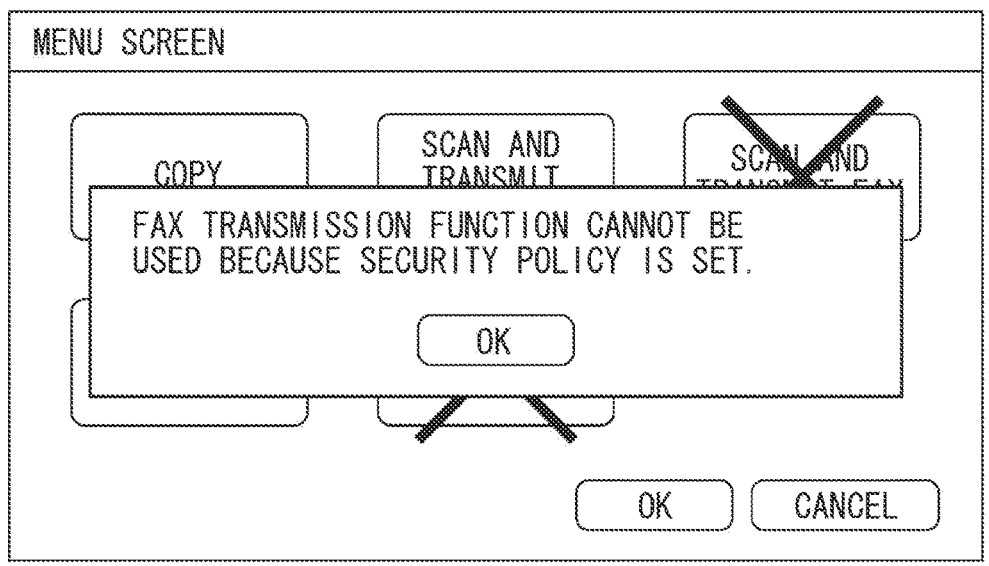

FIGS. 6A and 6B illustrate examples of an operation screen on the operation panel 305 of the device.

In the operation screen illustrated in FIGS. 6A and 6B, the security policy illustrated in FIGS. 5A and 5B is reflected. In the examples of FIGS. 5A and 5B, the security policy prohibits the transmission of a facsimile (FAX) and the use of a Universal Serial Bus (USB) interface. Thus, in FIG. 6A, menus for operations relating to "scan and transmit FAX" and "USB memory" are disabled so that the user cannot operate these menus. If the user selects such a disabled menu, a message indicating that the selected function cannot be executed due to the security policy may be displayed, as illustrated in FIG. 6B. In the security policy, there are setting items for restricting the functions of transmitting data to the outside through FAX and electronic mail, and the functions of interface portions such as the USB interface and a panel portion. Additionally, there may also be a setting item for restricting the function of authenticating the device.

FIG. 7 illustrates an example of a screen for setting a security policy, which is provided by the management apparatus 101.

On the screen illustrated in FIG. 7, unlike the screens illustrated in FIGS. 5A and 5B, it is possible to further specify a policy name and a policy version. There is a case where the management apparatus 101 manages a plurality of security policies so that each of the policies corresponds to a single department or organization. Thus, the management apparatus 101 manages policy names to identify the respective security policies.

It is possible to newly create or edit a security policy using the setting screen of the management apparatus 101 illustrated in FIG. 7. Further, it is possible to create a new security policy by importing an exported setting file, which will be described later with reference to FIG. 14, into the device management software 400.

Figure 8:
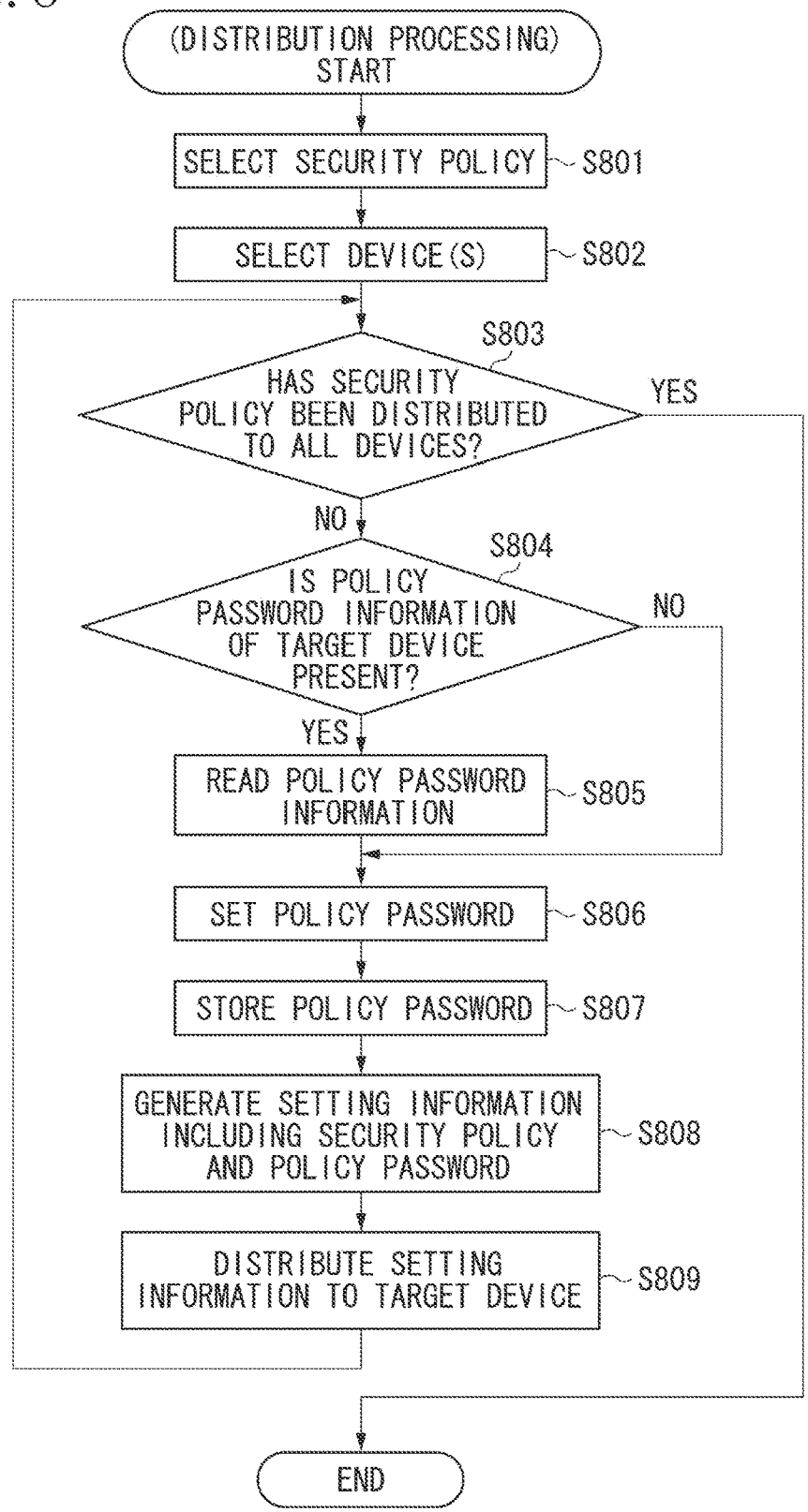
FIG. 8 is a flowchart illustrating processing in which the management apparatus distributes setting information to devices.

FIG. 8 is a flowchart illustrating processing in which the management apparatus 101 distributes setting information to the devices 102 to 104. The processing illustrated in the flowchart in FIG. 8 is achieved by executing the device management software 400 of the management apparatus 101.

In step S801, the setting information distribution unit 405 performs processing for selecting a security policy to be distributed. More specifically, first, the setting information distribution unit 405 acquires a list of security policies from the setting information database 408 via the setting information management unit 403. Then, the UI control unit 401 displays the acquired list of security policies using a GUI (see FIG. 9) and receives selection by the user.

FIG. 9 illustrates an example of a screen for selecting a security policy, which is displayed in step S801. A list of security policies illustrated in FIG. 9 includes, for example, two security policies having the policy names "public space" and "head office department". Further, information such as the policy version and the last update date and time of each security policy is also displayed. It is possible to select only one of the security policies on this screen. In the example of FIG. 9, the security policy "public space" is selected using a radio button.

In step S802, the setting information distribution unit 405 performs processing for selecting a device as a distribution target to which the security policy is to be distributed. More specifically, first, the setting information distribution unit 405 acquires a list of devices from the device information database 409 via the setting information management unit 403. Then, the UI control unit 401 displays the acquired list of devices using a GUI (see FIG. 10) and receives selection by the user. The user is assumed to be an administrator in charge of the maintenance and asset management of network devices, or a policy administrator who manages the policies of an organization.

FIG. 10 illustrates an example of a screen for selecting a device, which is displayed in step S802. A list of devices illustrated in FIG. 10 includes three devices having the device names "device A", "device B", and "device C". Further, in addition to the policy version supported by each device, device information such as the model name and the installation location of the device is also displayed on this screen. It is possible to select one or more of the devices as distribution targets to which the security policy is to be distributed. In the example of FIG. 10, the device A and the device B are selected as the distribution targets.

The devices listed in FIG. 10 may be narrowed down to only devices to which the security policy selected in step S801 can be distributed. The determination of whether the security policy can be distributed is made by comparing the policy version of the security policy selected in step S801 with the policy version supported by each device stored in the device information database 409. In the example of FIG. 10, it is assumed that the security policy has backward compatibility. Thus, for a policy version V1.00 of the security policy "public space" to be distributed, devices that support the policy version V1.00 or later are displayed in the list of devices. That is, a device that only supports a policy version V0.50 or earlier is not displayed in the list, whereas the device B, which supports a policy version V1.10, is included and displayed in the list.

In step S803, the setting information distribution unit 405 confirms whether the security policy has been distributed to all the devices selected in step S802. If the distribution of the security policy to all the devices is completed (YES in step S803), this distribution processing is ended. If there are devices to which the security policy has not been distributed (NO in step S803), the processes of step S804 and thereafter are performed on one of the devices as a processing target device.

In step S804, the setting information distribution unit 405 confirms, via the setting information management unit 403, whether policy password information of the target device is present in the device information database 409. If a policy password for the target device is present in the device information database 409 (YES in step S804), the processing proceeds to step S805. If a policy password for the target device is not present in the device information database 409 (NO in step S804), the processing proceeds to step S806. In step S805, the setting information distribution unit 405 reads and acquires the policy password information of the target device from the device information database 409 via the setting information management unit 403.

Figure 11B:
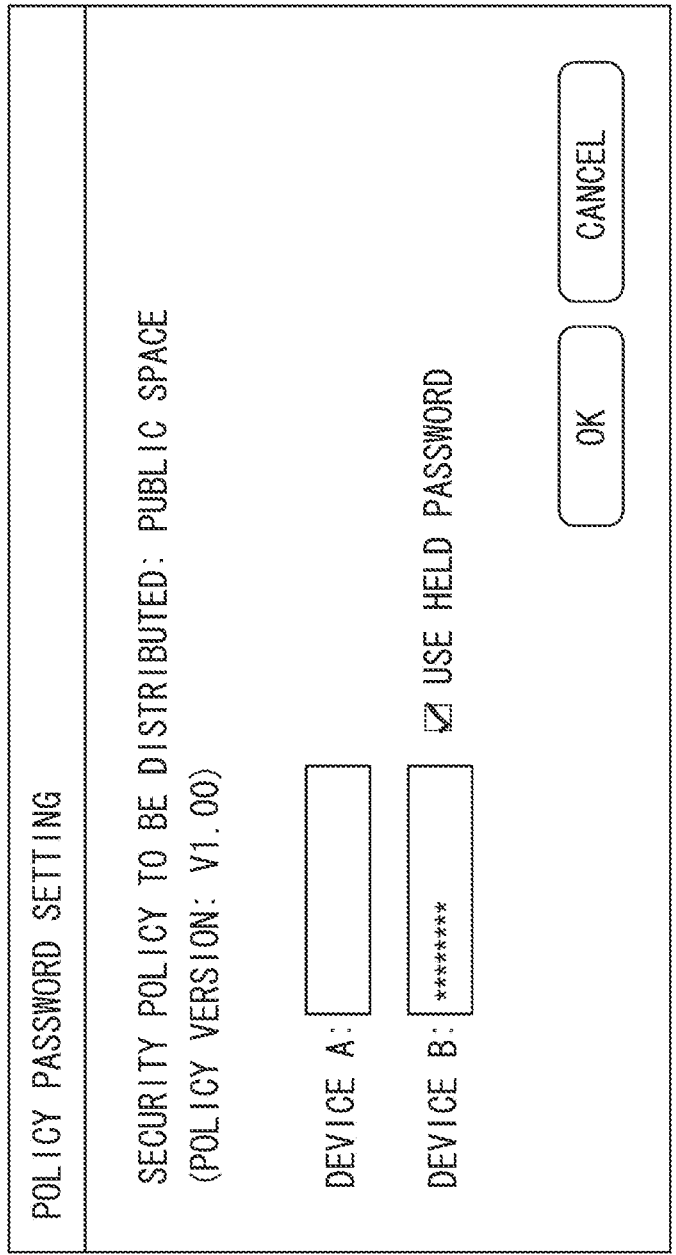

In step S806, the setting information distribution unit 405 receives an entry of a policy password for the security policy to be distributed to the target device. In this case, as illustrated in FIGS. 11A and 11B, the UI control unit 401 displays a setting screen using a GUI and receives an entry from the user. FIG. 11A illustrates a setting screen for receiving an entry of a policy password from the user. If a policy password has been acquired in step S805, the setting screen is displayed in a state where the acquired policy password has already been entered. The user can further edit the policy password.

In step S807, the setting information distribution unit 405 stores the policy password received in step S806, as device information about the device, in the device information database 409 via the setting information management unit 403. In step S808, the setting information distribution unit 405 generates setting information as distribution data based on the security policy selected in step S801 and the policy password set in steps S805 to S807. In step S809, the setting information distribution unit 405 distributes the setting information generated in step S808 to the target device via the communication unit 407.

In the processing illustrated in FIG. 8, the distribution processing is performed by individually setting a policy password for each of the plurality of devices serving as the distribution targets and then generating setting information. However, it is also possible to collectively perform the distribution processing by setting policy passwords at a time for all the devices selected in step S802 and then generating setting information. More specifically, in step S806, as illustrated in FIG. 11B, a screen for receiving entries of policy passwords for all the selected distribution target devices is provided.

In FIG. 11B, a text box for the device A is blank. This is because the security policy has not been distributed to the device A before, and therefore a policy password for the device A is not stored in the device information database 409. On the other hand, a policy password has already been entered in a text box for the device B. This is because a policy password used when the security policy was distributed to the device B in the past is stored in the device information database 409. This screen allows policy passwords for a plurality of devices to be entered. Thus, in the processes of steps S807 to S809, it is possible to distribute setting information to the plurality of devices.

In the screen illustrated in FIG. 11B, an instruction unit for, if a policy password has been entered into any one of the text boxes, collectively setting the same policy password for the other devices may be further provided. This can facilitate collectively setting the same policy password for a plurality of devices.

FIG. 18 illustrates the contents included in the device information database 409 managed by the management apparatus 101. The device information database 409 includes identification information, security policy version information, and policy password information of each device.

More specifically, as device information, information acquired by the device management unit 402, such as the device name and the serial number of each device and the policy version supported by the device, is stored. Further, there is also an area for holding a policy password for each device.

In step S804 described above, it is confirmed whether a policy password for the target device of interest is present in the device information database 409. Further, in step S807 described above, the policy password entered by the user on the screen illustrated in FIG. 11A or 11B is stored in the device information database 409.

FIGS. 12A and 12B illustrate examples of the setting information to be distributed to the device by the management apparatus 101 in step S809. These pieces of setting information are described in the Extensible Markup Language (XML). Further, these pieces of setting information are examples of pieces of setting information to be distributed in a case where the security policy having the name "public space" illustrated in FIGS. 9 and 10 is distributed to two devices having the names "device A" and "device B".

FIG. 12A is an example of setting information that is generated using the security policy having the policy name "public space" and is to be distributed to the "device A".

An element 1201 represents the settings for the security policy. The element 1201 includes, as attributes, identification information (ID) for the management apparatus 101 to identify the security policy, the policy version, and the policy name. An element 1202 represents a policy password and holds a password required to apply the settings for the security policy to the device A. An element 1203 represents the setting contents of the security policy and includes a plurality of child elements (Item tags). A single Item tag corresponds to a single policy item and has, as an attribute, identification information (ID) for identifying the item. The values "true" and "false" indicate whether each policy item is to be enabled.

FIG. 12B is an example of setting information that is generated using the security policy having the policy name "public space" and is to be distributed to the "device B". An element 1204, which represents a policy password, is different from the element 1202 illustrated in FIG. 12A.

In the examples of FIGS. 12A and 12B, different passwords are set in the elements 1202 and 1204. If, however, the same policy password is set for the devices A and B, the passwords in the elements 1202 and 1204 are also the same.

The setting information illustrated in FIGS. 12A and 12B can further include setting information (not illustrated) other than that of the security policy. For example, in step S808 described above, the setting information distribution unit 405 further inquiries of the user about whether another piece of setting information is also to be distributed. Then, if the user has provided an input indicating that another piece of setting information is also to be distributed, the UI control unit 401 displays a screen for further adding setting information to be distributed, using a GUI. At this time, examples of the setting information to be added include setting information that is not much related to security, such as address book information and user information. The additional setting information is not restricted by a policy password as described above. That is, if the user attempts to further change the additional setting information on an operation screen of the device, the device does not request an entry of a policy password as illustrated in FIG. 5A.

FIG. 13 illustrates an example of the setting contents of a security policy that can be held by the management apparatus 101 and the devices 102 to 104.

The management apparatus 101 manages a plurality of security policies as illustrated in FIG. 9. More particularly, the management apparatus 101 manages the setting contents of each security policy as illustrated in FIG. 13. If this security policy has been distributed and applied as setting information to the devices 102 to 104, then accordingly, functions are restricted as illustrated in FIGS. 6A and 6B. The setting screens illustrated in FIGS. 5A and 5B are also screens for setting a security policy for the device, which has the setting contents illustrated in FIG. 13. In the example of FIG. 13, an item having the setting value "true" indicates that the corresponding policy is enabled. For example, a policy item ID "I0001" is enabled, and therefore the user's use of the function for transmitting a FAX is restricted in the device.

The screens for setting a security policy that are displayed on the management apparatus 101 and the devices 102 to 104 may be different depending on the policy versions supported by the management apparatus 101 and the devices 102 to 104. For example, the setting information illustrated in FIGS. 12A and 12B includes the security policy in the policy version V1.00. Then, on the screen for setting a security policy that is provided by a device that supports the policy version V1.00, only setting items included in the security policy in the policy version V1.00 are displayed. On the other hand, in the case of a device that supports a later version such as the policy version V1.10, even if the security policy in the policy version V1.00 is applied to the device, a larger number of setting items may be displayed on the setting screen. This is because the number of setting items for security has increased due to a version upgrade of the security policy. Thus, if a security policy in a version earlier than a later policy version supported by a device is applied to the device, the setting values of only items that match the applied security policy are reflected.

Figure 14:
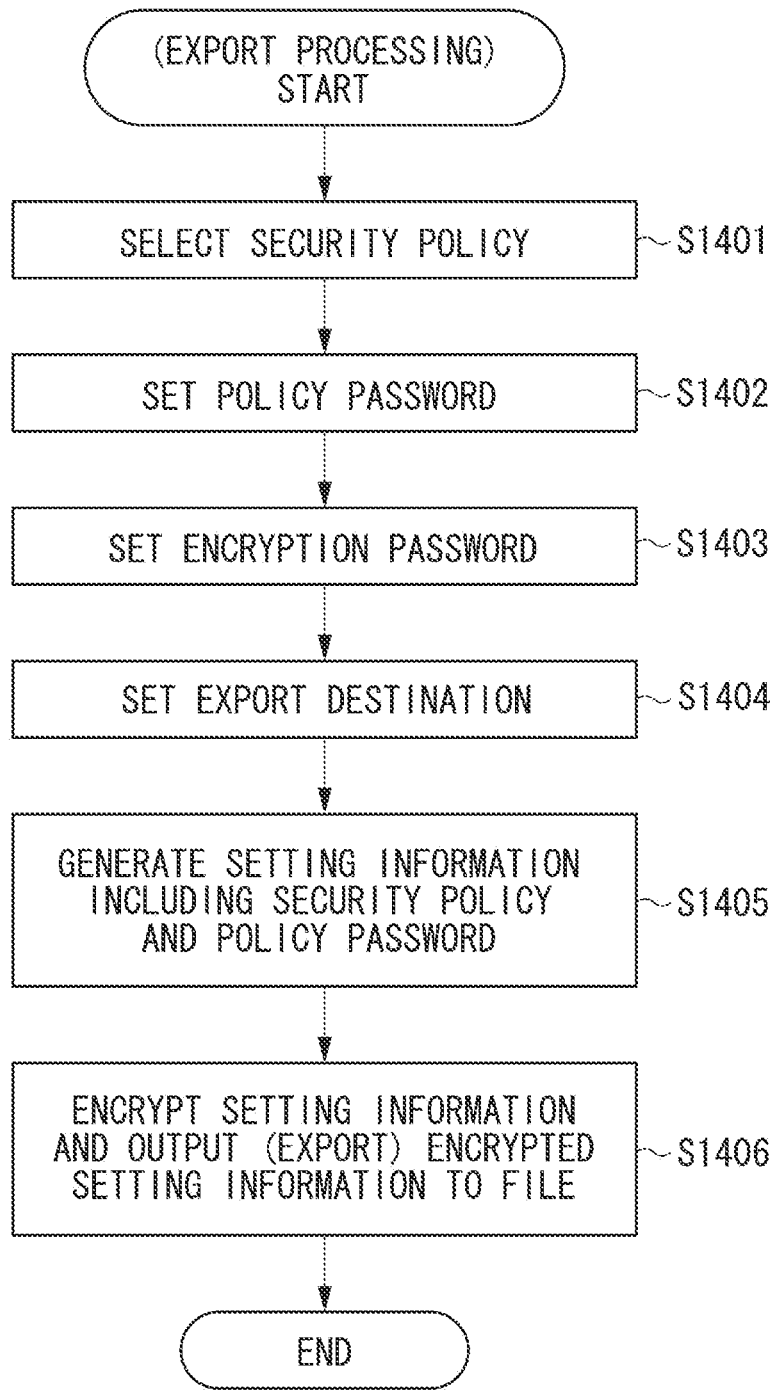
FIG. 14 is a flowchart illustrating processing in which the management apparatus exports setting information.

FIG. 14 is a flowchart illustrating processing in which the management apparatus 101 exports setting information as a file to a file system. This processing is also achieved by the management apparatus 101 executing the device management software 400.

At this time, the contents of the setting information to be exported as a file are in an XML format, similarly to the setting information illustrated in FIGS. 12A and 12B. The setting information, however, includes information that should be treated with confidentiality, such as a policy password and policy settings. Thus, the setting information is encrypted with a password different from the policy password. In the present exemplary embodiment, this password is referred to as an "encryption password" and treated in distinction from a policy password.

First, in step S1401, the setting information distribution unit 405 performs processing for selecting a security policy to be exported. More specifically, first, the setting information distribution unit 405 acquires a list of security policies from the setting information database 408 via the setting information management unit 403. Then, the UI control unit 401 displays the acquired list of security policies using a GUI and receives selection by the user.

In step S1402, the setting information distribution unit 405 receives an entry of a policy password for applying the security policy. At this time, the setting information distribution unit 405 receives an entry of a policy password from the user, using a GUI (see FIG. 15) displayed by the UI control unit 401. In step S1403, the setting information distribution unit 405 receives an entry of an encryption password for encrypting setting information. At this time, the setting information distribution unit 405 further receives an entry of an encryption password from the user, using the above-described GUI (see FIG. 15). In step S1404, the setting information distribution unit 405 receives an entry of a file path as the file output destination of the setting information. At this time, the setting information distribution unit 405 further receives an entry of a file path from the user, using the above-described GUI (see FIG. 15).

In step S1405, the setting information distribution unit 405 generates setting information using the security policy and the policy password obtained in steps S1401 and S1402. In step S1406, the setting information distribution unit 405 encrypts the generated setting information and outputs the encrypted setting information to the file path set in step S1404, thereby exporting the setting information. At this time, the exported file is to be decrypted using the encryption password set in step S1403.

Figure 15:
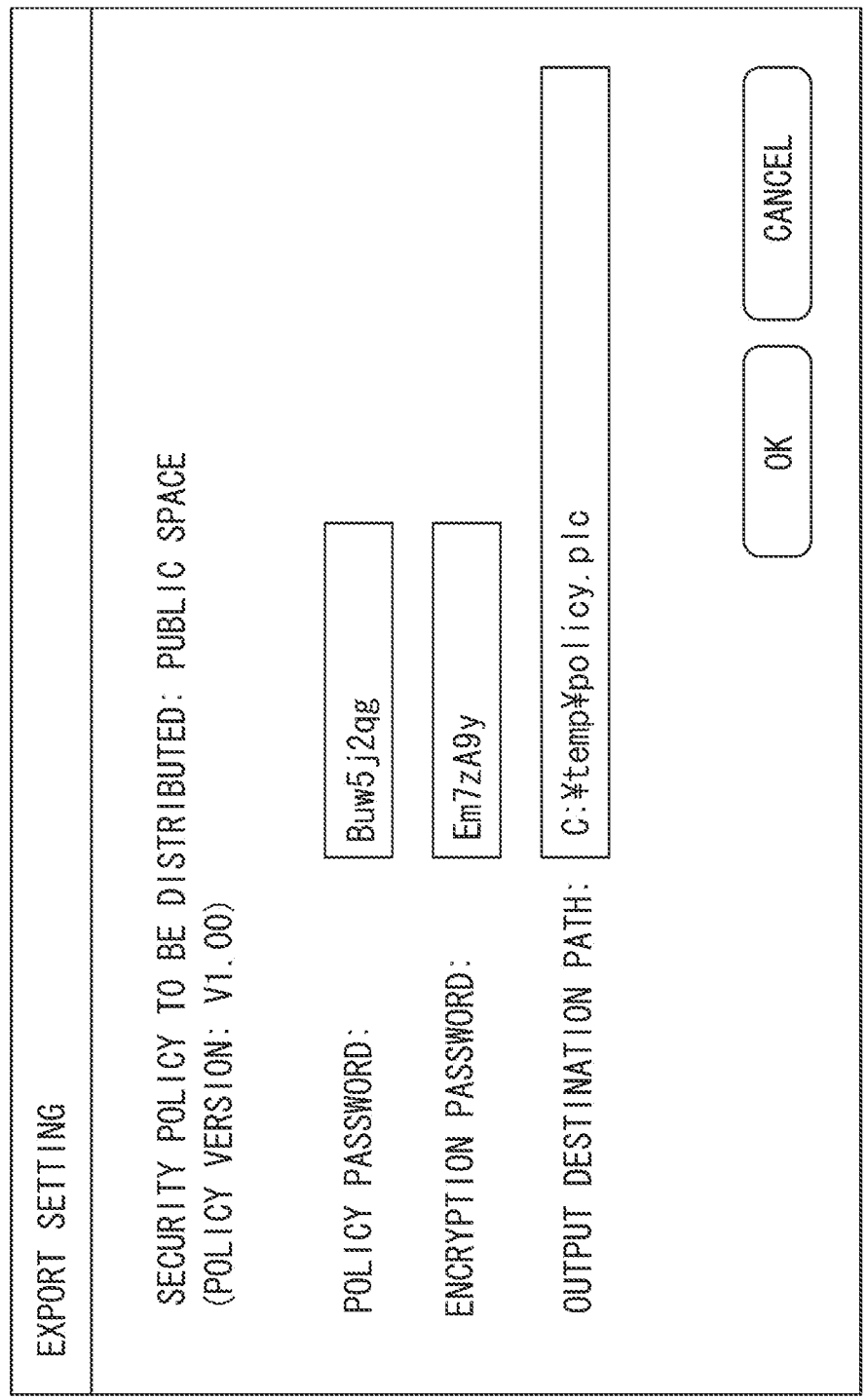
FIG. 15 illustrates an example of a screen for entering various pieces of information required for the export.

FIG. 15 illustrates an example of a screen for entering various pieces of information required for the export processing illustrated in FIG. 14. More specifically, the screen illustrated in FIG. 15 prompts the user to enter a policy password, an encryption password, and the file path of the output destination.

Figure 16:
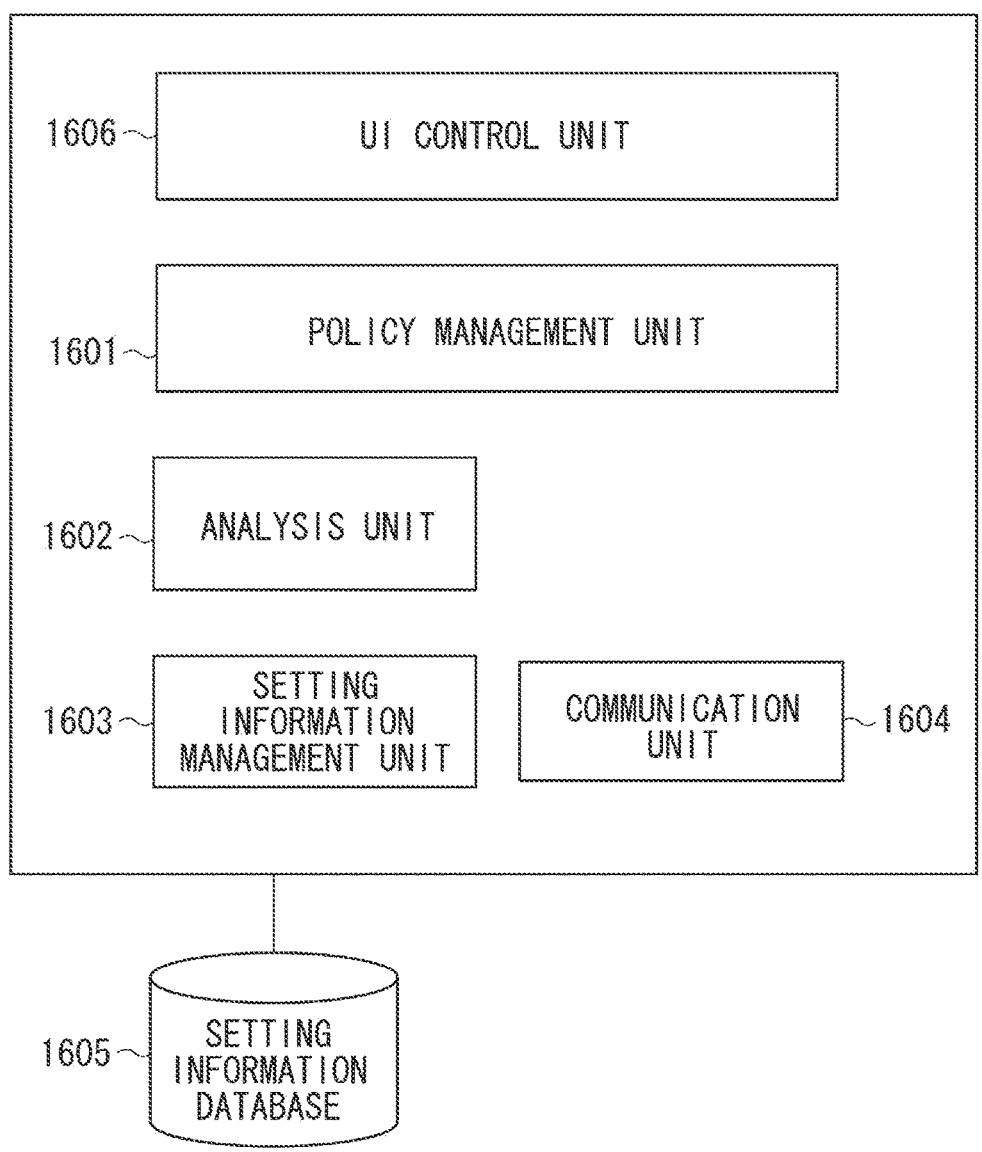
FIG. 16 is a diagram illustrating an example of a module configuration of software of each device.

FIG. 16 is a diagram illustrating an example of a module configuration of software of each of the devices 102, 103, and 104. Particularly, a description is given here of components related to software required to manage setting information and a security policy according to the present exemplary embodiment.

A policy management unit 1601 controls restrictions on various functions of the device according to the settings for a security policy stored in a setting information database 1605.

An analysis unit 1602 analyzes setting information received from the management apparatus 101 via a communication unit 1604. The analysis unit 1602 determines whether a policy password included in the received setting information matches a policy password stored in the setting information database 1605. Only if the policy passwords are determined to match, the analysis unit 1602 updates the settings for a security policy stored in the setting information database 1605, using a security policy included in the received setting information. Further, for a setting, other than the settings for the security policy, included in the received setting information, the analysis unit 1602 also updates the setting value stored in the setting information database 1605. At this time, the setting value to be updated is that of a setting, other than the settings for the security policy, included in the setting information and is that of only a setting that does not violate the security policy already stored in the setting information database 1605. Even in the case of a setting, other than the settings for the security policy, included in the setting information received from the management apparatus 101, if the setting value of the setting violates the security policy, the setting value is ignored by the analysis unit 1602 when updating the setting information database 1605, and is not reflected.

A setting information management unit 1603 stores, in the setting information database 1605, various setting values of setting information including the settings for a security policy, and reads the various setting values from the setting information database 1605. The setting information management unit 1603 stores the various setting values in the setting information database 1605 according to the analysis unit 1602.

A UI control unit 1606 provides a GUI for operating the device. The GUI is displayed on the operation panel 305 or displayed in a web browser (not illustrated) of another PC via a web server.

Figure 17:
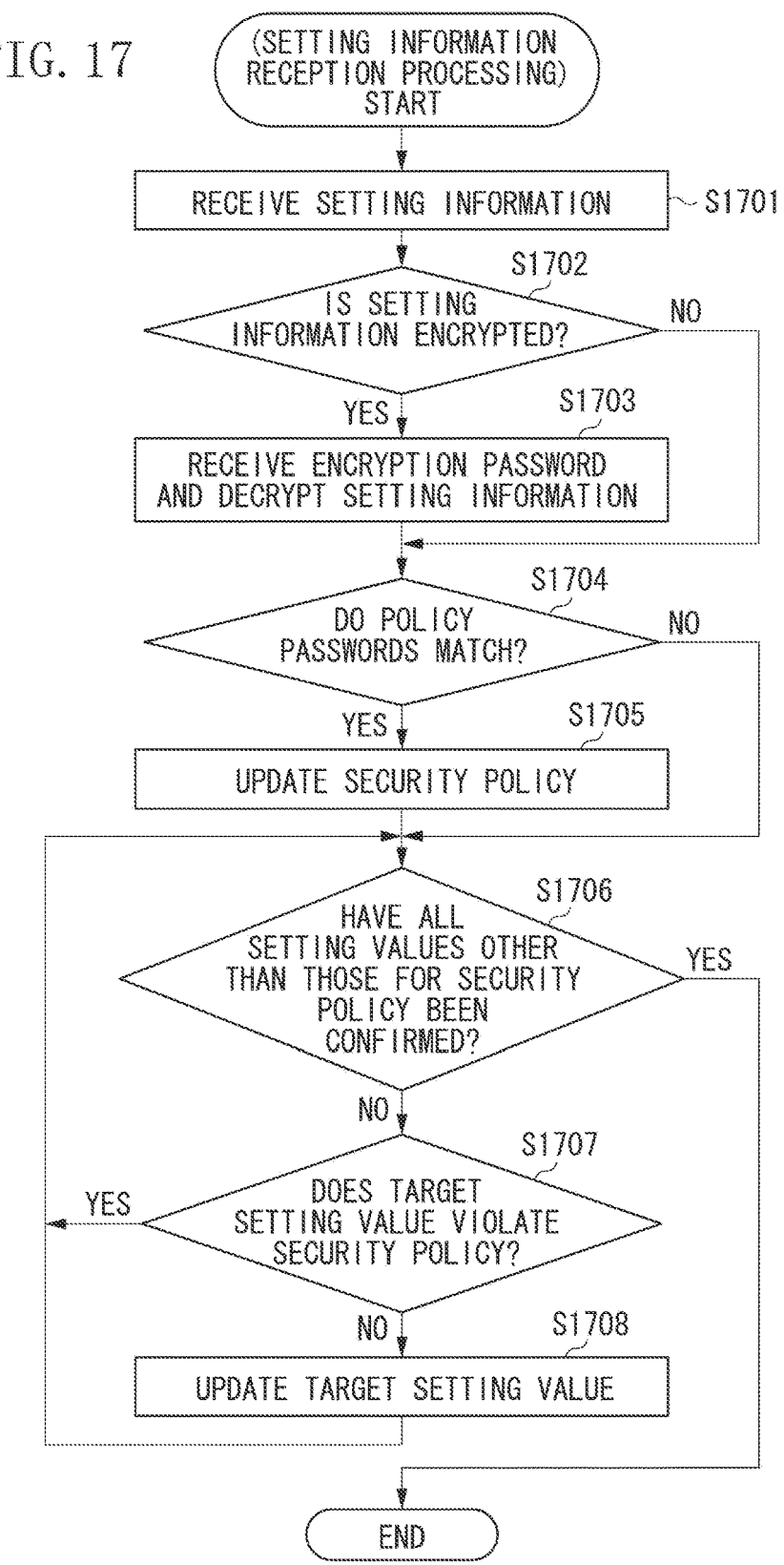
FIG. 17 is a flowchart illustrating processing in which each device receives setting information.

FIG. 17 is a flowchart illustrating processing in which each of the devices 102 to 104 receives setting information. This processing is achieved by the CPU 301 of the device reading and executing a program regarding the processing recorded in the HDD 304.

In step S1701, the communication unit 1604 receives setting information from the management apparatus 101. In step S1702, the analysis unit 1602 confirms whether the setting information received in step S1701 is encrypted. If the setting information is encrypted (YES in step S1702), the processing proceeds to step S1703. If the setting information is not encrypted (NO in step S1702), the processing proceeds to step S1704.

At this time, as an example of a case where the setting information received from the management apparatus 101 is encrypted, there is a case where the setting information exported once in the processing described in FIG. 14 is distributed as it is to the devices 102 to 104.

In step S1703, the analysis unit 1602 receives an entry of a password for decryption via a GUI displayed by the UI control unit 1606. At this time, only if the entered password matches an encryption password set in the setting information, the analysis unit 1602 decrypts the setting information received from the management apparatus 101.

In step S1704, the analysis unit 1602 determines whether a policy password included in the setting information matches a policy password stored in the setting information database 1605. If the policy passwords match (YES in step S1704), the processing proceeds to step S1705. If the policy passwords do not match (NO in step S1704), the processing proceeds to step S1706.

In step S1705, the analysis unit 1602 performs processing for updating the setting information database 1605, using setting values for a security policy included in the setting information received in step S1701. More specifically, the analysis unit 1602 updates via the setting information management unit 1603 the setting values of setting items for a security policy stored in the setting information database 1605, using the setting values of the same items included in the received setting information. Further, among the setting items for the security policy included in the received setting information, a setting item that is not managed by the setting information database 1605 is ignored, and is not reflected.

In step S1706, the analysis unit 1602 determines whether processing regarding the setting values of setting items, other than those for the security policy, included in the setting information received in step S1701 is completed. If the above processing is not completed (NO in step S1706), the processing proceeds to step S1707. If the above processing is completed (YES in step S1706), this processing is ended.

In step S1707, the analysis unit 1602 reads, as a target setting value, one of the setting values of the setting items, other than those for the security policy, included in the setting information received in step S1701 and determines the target setting value. More specifically, the analysis unit 1602 determines whether the target setting value violates the security policy according to a setting value stored in the setting information database 1605. For example, if the received setting information includes a setting value indicating that FAX is used as a communication method for an exception notification even though the transmission and reception of a FAX is prohibited by the security policy, it is determined that the setting value violates the security policy. If the setting value violates the security policy (YES in step S1707), the processing returns to step S1706. If the setting value does not violate the security policy (NO in step S1707), the processing proceeds to step S1708. Then, the analysis unit 1602 updates the setting information database 1605 using the target setting value via the setting information management unit 1603.

At this time, if the setting value violates the security policy based on the determination of the analysis unit 1602 in step S1707, the setting value is not reflected in the setting information database 1605.

In the present exemplary embodiment, when the management apparatus gives an instruction to distribute setting information including a security policy, the management apparatus sets a policy password for each device. Then, only if a policy password already managed by the distribution destination device matches a password included in the distributed setting information, a security policy of the device is updated. With this configuration, it is possible to easily distribute setting information including a security policy to a plurality of devices, while preventing a security policy of each device from being easily changed.

In a second exemplary embodiment of the present invention, an example will be described where the management apparatus 101 acquires setting information from a particular device for use as a backup or for reuse as distribution data to be distributed to another device. At this time, the management apparatus 101 according to the present exemplary embodiment separately stores and manages a security policy and a policy password included in the setting information. Then, when the security policy is to be distributed and if a predetermined condition is satisfied, the managed policy password is reused to save the trouble of entering a password, thereby improving convenience.

In the present exemplary embodiment, components similar to those of the first exemplary embodiment are designated by the same numerals and will not be described in detail here. Only the differences from the first exemplary embodiment will be described below.

Figure 19:
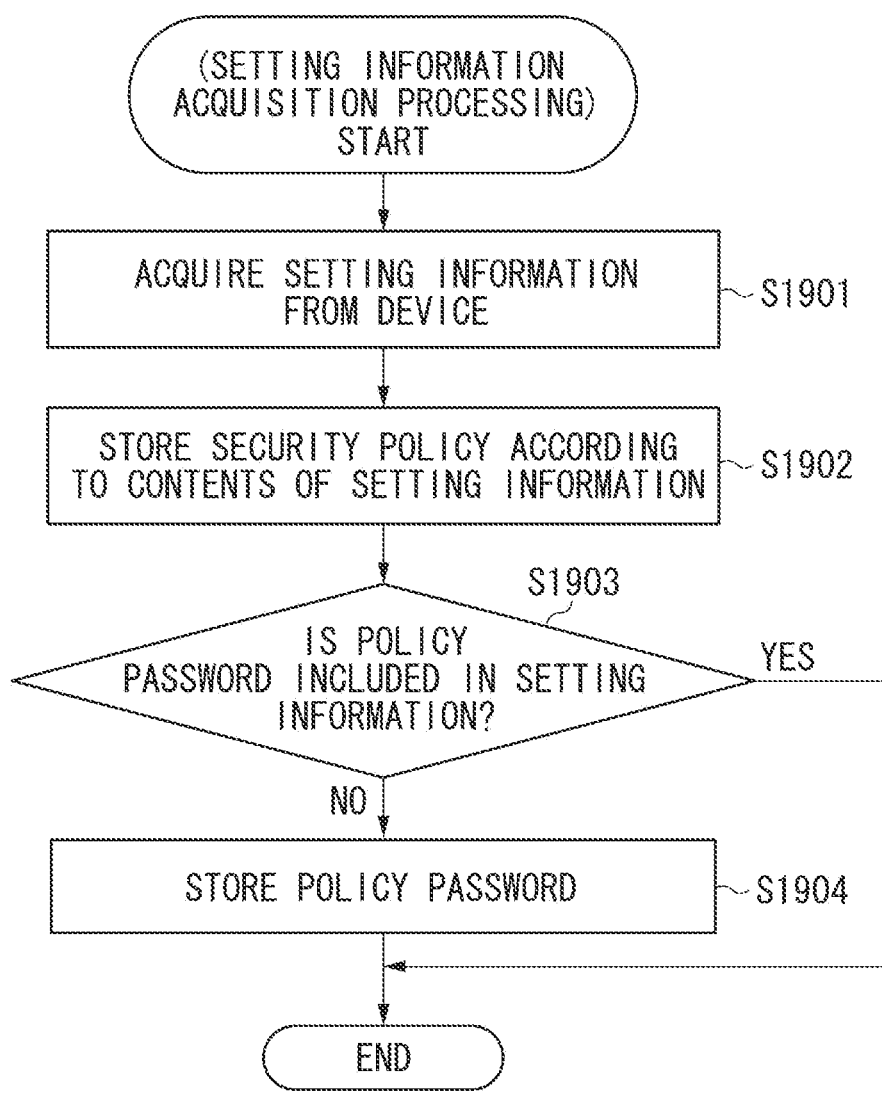
FIG. 19 is a flowchart illustrating processing in which a management apparatus acquires setting information from a device according to a second exemplary embodiment.

FIG. 19 is a flowchart illustrating processing in which the management apparatus 101 acquires setting information from any one of the devices 102 to 104. This processing is achieved by the management apparatus 101 executing the device management software 400.

In step S1901, the setting information acquisition unit 404 makes a predetermined request to the device to acquire setting information. At this time, the user can specify a necessary setting item in the request to acquire setting information desired by the user.

FIG. 20 illustrates the setting information to be acquired from the device by the management apparatus 101. Basically, this information is similar to the setting information illustrated in FIGS. 12A and 12B, and small differences will be described below.

An element 2001 represents the settings for a security policy. The security policy is held by the device, and therefore the ID and the policy name included in the element 1201 illustrated in FIGS. 12A and 12B are not included in the element 2001. An element 2002 represents a policy password. In this case, a password stored in the setting information database 1605 on the device side is set in the element 2002. An element 2003 represents the setting contents of the security policy and describes the setting value of each item for the current security policy of the device. An element 2004 represents various pieces of information of the device other than that for the security policy. In the example of FIG. 20, the element 2004 describes the device name, the serial number, and the model name. Similarly to FIGS. 12A and 12B, the setting information illustrated in FIG. 20 may include various settings (not illustrated) other than those for the security policy and the device information, and address book information.

Next, in step S1902, the setting information management unit 403 newly creates a security policy using setting values included in the acquired setting information and saves the created security policy in the setting information database 408. At this time, the policy name of the created security policy may be automatically set as, for example, "reuse security policy" provisionally to display a list of security policies on a setting screen of the management apparatus 101 as illustrated in FIG. 9. A policy password is not set in a file of the created security policy. That is, at this time, the security policy is managed using the policy name "reuse security policy" in a state where the policy password indicated in the element 2002 illustrated in FIG. 20 is deleted.

If the policy version indicated in the element 2001 illustrated in FIG. 20 cannot be treated by (is unknown to) the management apparatus 101, the policy version of the security policy created in step S1902 is set to the latest one of policy versions that can be treated by the management apparatus 101. Further, among the contents of the security policy described in the element 2003 in FIG. 20, a setting item that cannot be treated by the management apparatus 101 is ignored. Conversely, if a setting item corresponding to an item included in the latest policy version that can be treated by the management apparatus 101 is not present in the element 2003 in FIG. 20, a predetermined initial value is set for the policy item.

In step S1903, the setting information acquisition unit 404 determines whether a policy password is included in the acquired setting information. At this time, if a policy password is included (YES in step S1903), the processing proceeds to step S1904. If a policy password is not included (NO in step S1903), this processing is ended.

In step S1904, the setting information management unit 403 stores in the setting information database 408 the policy password included in the acquired setting information. In the present exemplary embodiment, as illustrated in FIG. 21, the setting information database 408 manages identification information of the acquisition source device and the policy password in association with the security policy (policy ID: P0003) created in step S1902.

In FIG. 21, for each of security policies indicated by the policy IDs P0001 and P0002, an acquisition source device ID is blank. This indicates that these security policies are not acquired from a device, but are created on a setting screen of the management apparatus 101.

Figure 22:
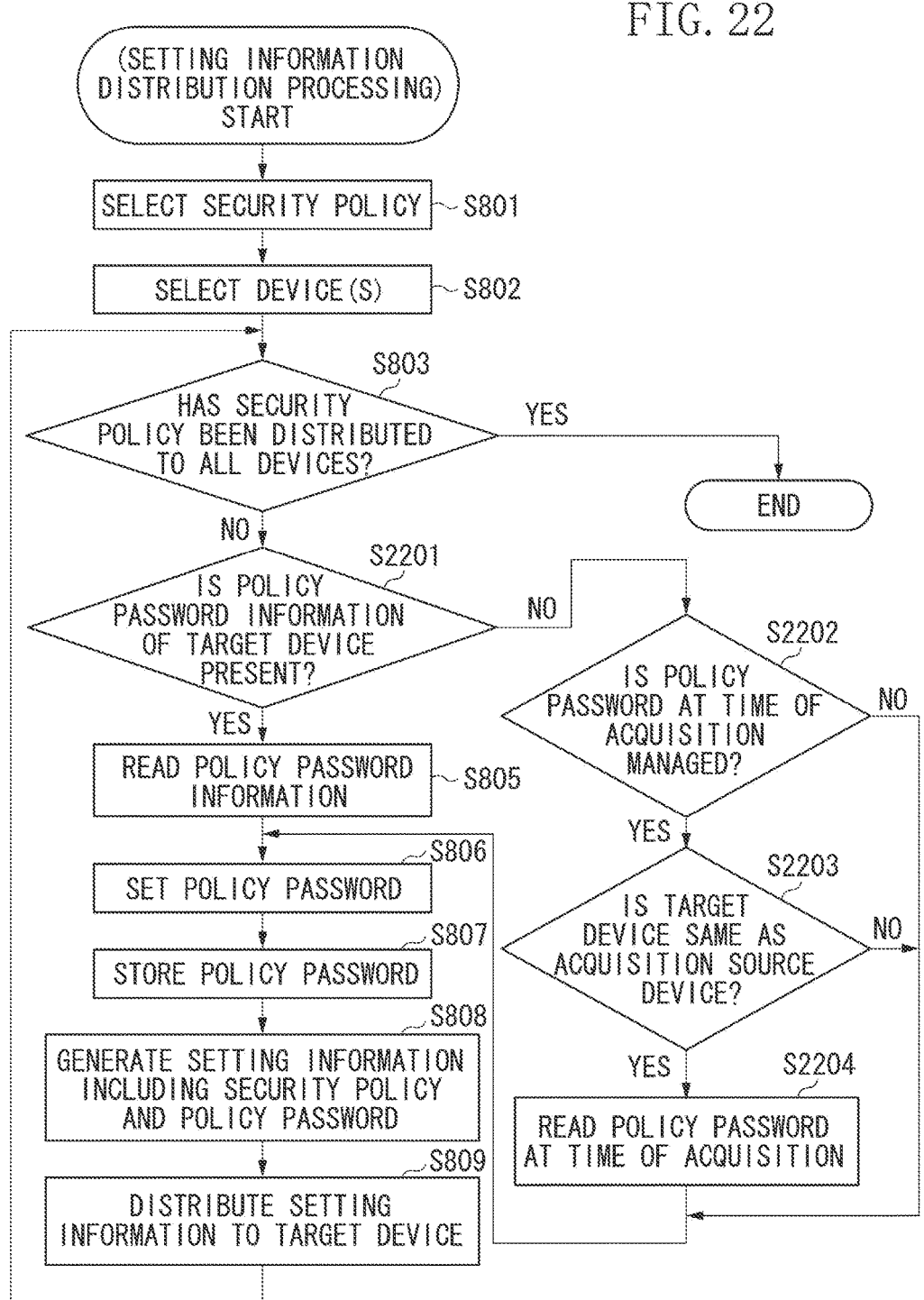
FIG. 22 is a flowchart illustrating processing in which the management apparatus distributes setting information to devices according to the second exemplary embodiment.

FIG. 22 is a flowchart illustrating the flow of processing in which the management apparatus 101 distributes setting information to the devices 102, 103, and 104. The processing illustrated in the flowchart in FIG. 22 is performed by the device management software 400 of the management apparatus 101. That is, the processing of the flowchart in FIG. 22 is achieved by the CPU 201 reading and executing a program recorded in the HDD 212. Processes similar to those in FIG. 8 are designated by the same numerals and will not be described here.

In step S2201, similarly to step S804 in FIG. 8, the setting information distribution unit 405 determines whether policy password information of the target device is present in the device information database 409. If a policy password is present (YES in step S2201), the processing proceeds to step S805. If a policy password is not present (NO in step S2201), the processing proceeds to step S2202.

In step S2202, the setting information management unit 403 determines whether a policy password at the time of acquisition is managed by the setting information database 408 in association with the security policy selected in step S801. If the policy password is managed (YES in step S2202), the processing proceeds to step S2203. If the policy password is not managed (NO in step S2202), the processing proceeds to step S806.

In step S2203, the setting information management unit 403 determines whether the target device is the same as the acquisition source device managed in association with the security policy selected in step S801. If the target device is the same as the acquisition source device (YES in step S2203), the processing proceeds to step S2204. If the target device is not the same as the acquisition source device (NO in step S2203), the processing proceeds to step S806.

In step S2204, the setting information management unit 403 reads and acquires from the setting information database 408 the policy password at the time of acquisition that has been confirmed in step S2202.

FIG. 23 illustrates an example of a screen for receiving an entry of a policy password, which is displayed by the UI control unit 401 in step S806 after the processing in FIG. 22. This is a modification example of the screen illustrated in FIG. 11B. This is an example of the case where the user has selected the above-described "reuse security policy" as the security policy to be distributed. At this time, a "device A", a "device B", and a "device D" are selected as the distribution target devices.

In FIG. 23, the policy password read in step S805 and stored in the device information database 409 is entered in advance in a text box for the device B. Further, the policy password at the time of acquisition that has been read in step S2204 and managed by the setting information database 408 is entered in advance in a text box for the device D.

The determination condition in step S2203 may be set to an appropriate condition, taking into account the risk and convenience of reusing a password, and is not limited to the condition illustrated in the present exemplary embodiment. For example, the condition can be such that if model information of the distribution target device is the same as model information of the acquisition source device, the determination is "Yes". Further, it is also possible to perform processing of, if a password at the time of acquisition is managed (YES in step S2202), always using this password.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus which has a printer engine, comprising:
    a network interface;
    a facsimile communication unit;
    a memory storing instructions; and
    a processor which is capable of executing the instructions causing the image forming apparatus to:
    manage a password for an administrator about settings corresponding to functions of the image forming apparatus;
    receive a password via a web browser executed by a personal computer when an operation for the settings is performed;
    provide a setting screen to the web browser by a web server of the image forming apparatus, wherein whether processing using a Universal Serial Bus (USB) interface is to be restricted, whether a facsimile function of transmitting data to an outside by the facsimile communication unit is to be restricted, and whether a predetermined function of transferring data to the outside using the network interface is to be restricted are designatable on the setting screen; and
    reflect, on the image forming apparatus, at least one of setting values corresponding to restriction of the processing using the USB interface, restriction of the facsimile function, and restriction of the predetermined function according to one or more designations via the setting screen,
    wherein, when the password for the administrator has been received from the web browser, the web browser is capable of designating the restriction of the processing using the USB interface, the restriction of the facsimile function, and the restriction of the predetermined function via the setting screen.

2. The image forming apparatus according to claim 1, wherein the predetermined function includes a function of transmitting data by electronic mail.

3. The image forming apparatus according to claim 1, wherein in a case where menus corresponding to the processing using the USB interface, the facsimile function, and the predetermined function, respectively, are selected on an operation screen of the image forming apparatus according to the reflection, the instructions further cause the image forming apparatus to display a message indicating that a function corresponding to the selection is not available.

4. A method for an image forming apparatus which has a printer engine, the method comprising:
    managing a password for an administrator about settings corresponding to functions of the image forming apparatus;
    receiving a password via a web browser executed by a personal computer when an operation for the settings is performed;
    providing a setting screen to the web browser by a web server of the image forming apparatus, wherein whether processing using a Universal Serial Bus (USB) interface is to be restricted, whether a facsimile function of transmitting data to an outside by a facsimile communication unit is to be restricted, and whether a predetermined function of transferring data to the outside using a network interface is to be restricted are designatable on the setting screen; and
    reflecting, on the image forming apparatus, at least one of setting values corresponding to restriction of the processing using the USB interface, restriction of the facsimile function, and restriction of the predetermined function according to one or more designations via the setting screen,
    wherein, when the password for the administrator has been received from the web browser, the web browser is capable of designating the restriction of the processing using the USB interface, the restriction of the facsimile function, and the restriction of the predetermined function via the setting screen.

5. The method according to claim 4, further comprising displaying, in a case where menus corresponding to the processing using the USB interface, the facsimile function, and the predetermined function, respectively, are selected on an operation screen of the image forming apparatus according to the reflection, a message indicating that a function corresponding to the selection is not available.

6. A non-transitory computer readable storage medium on which is stored a computer program for making a computer execute a method for an image forming apparatus which has a printer engine, the method comprising:
    managing a password for an administrator about settings corresponding to functions of the image forming apparatus;
    receiving a password via a web browser executed by a personal computer when an operation for the settings is performed;
    providing a setting screen to the web browser by a web server of the image forming apparatus, wherein whether processing using a Universal Serial Bus (USB) interface is to be restricted, whether a facsimile function of transmitting data to an outside by a facsimile communication unit is to be restricted, and whether a predetermined function of transferring data to the outside using a network interface is to be restricted are designatable on the setting screen; and reflecting, on the image forming apparatus, at least one of setting values corresponding to restriction of the processing using the USB interface, restriction of the facsimile function, and restriction of the predetermined function according to one or more designations via the setting screen, wherein, when the password for the administrator has been received from the web browser, the web browser is capable of designating the restriction of the processing using the USB interface, the restriction of the facsimile function, and the restriction of the predetermined function via the setting screen.

* * * * *